United States Patent Office 3,654,239
Patented Apr. 4, 1972

3,654,239
PROCESS FOR THE PREPARATION OF POLY-
(α-CYANOACRYLATES)
John M. McIntire and Thomas H. Wicker, Jr., Kingsport,
Tenn., assignors to Eastman Kodak Company, Rochester, N.Y.
No Drawing. Continuation-in-part of application Ser. No. 729,905, May 17, 1968. This application Nov. 20, 1970, Ser. No. 91,539
Int. Cl. C08f 1/11, 3/74
U.S. Cl. 260—78.4 N
10 Claims

ABSTRACT OF THE DISCLOSURE

Process for preparing a poly(α-cyanoacrylate) comprising polymerizing a monomer employing a free radical or anionic catalyst and using a solvent having a solubility parameter of about 6.9 to about 9.0 and dielectric constant of less than about 10, whereby the polymer separates from the solvent during polymerization. These poly(α-cyanoacrylates) are useful as viscosity modifiers in α-cyanoacrylate adhesive compositions.

---

This application is a continuation-in-part of copending application Ser. No. 729,905, filed May 17, 1968, now U.S. Pat. No. 3,564,078.

This invention relates to α-cyanoacrylate adhesive compositions for surgical and other uses. More particularly, this invention relates to a unique polymerization process for preparing poly(α-cyanoacrylates) by employing selected anionic or free radical catalysts (initiators) and solvents having solubility parameters of 6.9 to 9.0 and dielectric constants of less than 10.

The efficacy of the esters of α-cyanoacrylic acid as adhesives for general industrial and other uses is well known, having been described and claimed in numerous U.S. and foreign patents and in the literature. More recently, the medical and patent literature has disclosed that certain of these α-cyanoacrylates can be successfully used in many surgical applications as, for example, in the setting of fractured bone structures, as subsitutes for, or adjuncts to, surgical sutures, in retarding the flow of blood from wounds and as aids in the repair and regrowth of living tissue generally. One of the problems encountered in the uses of these compositions, both as industrial and as surgical adhesives, has been control of the viscosity or flowability of the material when applied to surfaces to be bonded or otherwise treated.

To take a typical example, when an α-cyanoacrylate such as methyl α-cyanoacrylate, probably the best known and most widely used cyanoacrylate adhesive, is applied to surfaces to be joined, it can be applied in monomeric form, and the resultant polymerization of the ester in situ gives rise to the desired adhesive bond. However, the ester in this form is too fluid at ordinary temperatures to be controllable for certain applications. It is, therefore, necessary to provide a means of controlling the viscosity or flowability of the composition. This is accomplished by adding a viscosity modifier or thickener to the monomeric material.

In certain industrial applications a relatively high degree of fluidity may not be objectionable and may even be desirable, but for other industrial uses and for surgical uses, the viscosity or flowability of the composition must be controlled in order to prevent undue escape of the adhesive from any given area to which it is applied as well as to allow sufficient time for the monomeric material to polymerize and thus to bring about the desired bonding action.

The problem here dealt with has already been generally recognized by workers in this field and a rather wide variety of viscosity modifiers for α-cyanoacrylate adhesives have been suggested in patents and the literature. The present invention relates to a process for preparing advantageous viscosity modifiers. See British Pat. 1,123,-360 and U.S. Pat. 3,178,379.

Accordingly, this invention has as an object to provide a process for preparing a viscosity modifier useful in α-cyanoacrylate adhesive compositions having viscosity and other characteristics which render such compositions outstandingly useful as adhesives, e.g., as set forth in the above-identified parent patent application.

A further object is to provide a process for preparing poly(α-cyanoacrylate) esters having solubility in α-cyanoacrylate ester monomers as well as having other properties which give them outstanding value as viscosity modifiers in surgical and other α-cyanoacrylate adhesive compositions.

Other objects will become apparent from the description herein and the claims which follow.

An adhesive composition may be prepared by adding to monomeric α-cyanoacrylate esters, as a viscosity modifier, from about two percent to about seven percent by weight, based on the weight of the total composition of a poly(α-cyanoacrylate) having an inherent viscosity of up to about 2.5, which is prepared by the novel process of this invention.

The preferred percentage of viscosity modifier added is from about two percent to about four percent based on the weight of the total composition and the preferred range of the inherent viscosity of the poly(α-cyanoacrylate) is from about .5 to about 2.5.

The poly(α-cyanoacrylate) esters prepared by the novel process of this invention are especially advantageous in that the amount required for a specific increase in viscosity of the monomer is substantially less than the amount required to obtain a similar increase in viscosity utilizing prior art poly(α-cyanoacrylates).

According to one aspect of this invention there is provided a process for preparing a poly(α-cyanoacrylate) ester which is a normally solid polymer which comprises:

(A) Mixing (1) an α-cyanoacrylate monomer having the structural formula

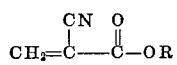

wherein R is an alkyl group having 1–16 carbon atoms; a haloalkyl, alkoxyalkyl, alkenyl, cyanoalkyl, or phenylalkyl group having 1–10 carbon atoms; a cyclohexyl group; or phenyl group, and (2) an organic solvent having a solubility parameter from about 6.9 to 9.0 and a dielectric constant of less than 10, whereby a solution is formed.

(B) Adding to said solution a catalytically effective amount of up to 2% by weight, based on the weight of the monomer, of a catalyst selected from (1) a free radical catalyst, or (2) an anionic catalyst, at a temperature from about 20 to about 100° C., whereby said monomer is polymerized and said solid polymer separates from said solution.

The α-cyanoacrylate esters which can be advantageously utilized according to the above process can be produced by the proceduce of Joyner and Hawkins U.S. Pat. 2,721,858, involving reaction of an α-cyanoacetate ester with formaldehyde in a non-aqueous organic solvent and in the presence of a basic catalyst, followed by pyrolysis of the anhydrous intermediate polymer in the presence of a polymerization inhibitor so as to form the desired monomer. A monomer prepared with low moisture content and essentially free of impurities has the best activity for surgical use. Another suitable process for preparing such α-cyanoacrylate esters is that described in Hawkins and McCurry U.S. Pat. 3,254,111.

The particular monomeric α-cyanoacrylate ester used for this invention is not critical to the practice thereof. Examples of typical monomeric α-cyanoacrylates which can be advantageously employed in the novel process of this invention are the alkyl esters having 1–16 carbon atoms such as the methyl, ethyl, propyl, butyl, isobutyl, decyl and dodecyl esters; alkenyl, haloalkyl, alkoxyalkyl, cyanoalkyl or phenylalkyl esters having 1–10 carbon atoms such as the 3-chloropropyl, methoxyisopropyl, isobutoxypropyl, methoxymethyl, ethoxyethyl, 2,2,2-trifluoroethyl, trifluoroethyl, benzyl, allyl, 1-butenyl, methallyl, and tolyl esters; cyclohexyl esters and phenyl esters.

The especially advantageous polymerization process of this invention requires the free radically or anionically initiated polymerization of esters of cyanoacrylic acid in solvents having solubility parameters of 6.9 to 9.0 and dielectric constants of less than 10. Solubility parameter determination is set out in the Polymer Handbook, Section IV, pp. 341–368, Interscience Publishers, a division of John Wiley & Sons, N.Y., 1967. As the polymerization proceeds, the poly(α-cyanoacrylate) ester being formed precipitates. This manner of precipitation allows control of the degree of polymerization, allows control of heat given off during polymerization, gives high molecular weight poly(α-cyanoacrylates) and gives easily isolated and purified products.

These unique solvents which cause precipitation of the forming polymer are determinative of the especially advantageous products produced by the novel process of this invention.

Examples of solvents suitable for the practice of this invention are:

| Solvent | Solubility parameter | Dielectric constant |
| --- | --- | --- |
| n-Pentane | 7.0 | 1.844 |
| n-Hexane | 7.3 | 1.890 |
| n-Heptane | 7.4 | ca. 1.9 |
| n-Octane | 7.6 | 1.948 |
| Methylcyclohexane | 7.8 | ca. 2.4 |
| Cyclohexane | 8.2 | 2.22 |
| Bicyclohexyl | 8.5 | ca. 2.5 |
| Carbon tetrachloride | 8.6 | 2.238 |
| Cyclopentane | 8.7 | 1.965 |
| p-Chlorotoluene | 8.8 | 6.08 |
| Ethylbenzene | 8.8 | 2.412 |
| Toluene | 8.9 | 2.43 |

In a preferred embodiment of this invention the range of solubility parameter is from about 7 to about 8 and the dielectric constant of the solvent is less than 4.

The polymerization of the monomeric α-cyanoacrylate may be initiated by either a free radical or anionic catalyst. Suitable free radical catalysts which can be used to initiate this polymerization include: azobis(isobutyronitrile), benzoyl peroxide, acetyl peroxide, 2,4-dichlorobenzoyl peroxide, and t-butylperoxypivalate. Materials which serve as anionic catalysts are selected from the class of Lewis bases having an unshared pair of electrons. The anionic catalysts which are particularly useful are trialkyl phosphite and trialkylamines such as triethyl phosphate and triethylamine.

The temperature at which this process is carried out is dependent upon the particular poly(α-cyanoacrylate) to be formed and the catalyst which is being used. Generally, the reaction can be carried out at room temperature when an anionic catalyst is utilized. When a free radical catalyst is used, temperatures in the range of from about 40–100° C. can be advantageously employed.

This invention may be more fully understood by reference to the following illustrative examples.

EXAMPLE 1

Preparation of poly(ethyl 2-cyanoacrylate)

A mixture of ethyl 2-cyanoacrylate (10.00 g.), n-hexane (25.00 g.), and azobis(isobutyronitrile) (0.10 g.) is added to a clean, 4-oz., dry nitrogen-flushed, high-pressure bottle. The bottle is sealed with a crown closure after a final ten-second purging with dry nitrogen and then is tumbled in a water bath, first at 60° C. for 45 minutes and finally at 50° C. for nine hours. The precipitated polymer is collected on a suction funnel, washed with an additional amount of hexane, and dried in a circulating air oven at 50° C. overnight. The dry polymer (81.7% yield) has an inherent viscosity in nitromethane of 1.72.

EXAMPLE 2

Preparation of poly(butyl 2-cyanoacrylate)

A mixture of freshly distilled butyl 2-cyanoacrylate (10.00 g.), n-hexane (40.00 g.), and azobis (isobutyronitrile) (0.10 g.) is added to a clean, 7-oz., high-pressure bottle. The bottle is purged with dry nitrogen for ten seconds prior to sealing with a crown closure cap. The bottle is then tumbled in a 60° C. water bath for 45 minutes and at 50° C. for about 10 hours. The precipitated polymer is collected on a suction funnel, washed with an additional amount of hexane, and dried in a circulating air oven at 50° C. overnight. The dried polymer (97.9% yield) has an inherent viscosity in dimethylformamide of 1.26.

EXAMPLE 3

Preparation of poly(octyl 2-cyanoacrylate)

A mixture of octyl 2-cyanoacrylate (10.00 g.), heptane (30.00 g.), and benzoyl peroxide (0.10 g.) is added to a clean, 4-oz., high-pressure bottle. The bottle is purged with dry nitrogen for ten seconds prior to sealing with a crown closure cap. The bottle is then tumbled in a 70° C. water bath for one hour and 50° C. for 15 hours. The precipitated polymer is collected on a suction funnel, washed with an additional amount of heptane, and dried in a circulating air oven at 50° C. overnight. The dried polymer (92.5% yield) has an inherent viscosity in acetone of 1.43.

EXAMPLE 4

Preparation of poly(3-methoxybutyl 2-cyanoacrylate)

A mixture of 3-methoxybutyl 2-cyanoacrylate (10.00 g.), cyclohexane (50.00 g.), and azobis(isobutyronitrile) (0.2 g.) is added to a clean, 7-oz., high-pressure bottle. The bottle is purged with dry nitrogen for ten seconds prior to sealing with a crown closure cap. The bottle is then tumbled in a 50° C. water bath for 20 hours. The precipitated polymer is collected on a suction funnel, washed with an additional amount of cyclohexane, and dried in a circulating air oven at 50° C. overnight. The dried polymer (91.7% yield) has an inherent viscosity in dimethylformamide of 0.87.

EXAMPLE 5

Preparation of poly($\beta,\beta,\beta$-trifluoroisopropyl 2-cyanoacrylate)

A mixture of $\beta,\beta,\beta$-trifluoroisopropyl 2-cyanoacrylate (10.00 g.), n-pentane (20.00 g.), and azobis(isobutyronitrile) (0.5 g. is added to a clean, 4-oz., dry nitrogen-flushed, high-pressure bottle. The bottle is sealed with a crown closure after a final ten-second purging with dry nitrogen, and then is tumbled in a water bath first at 60° C. for one hour and finally at 50° C. for 15 hours. The precipitated polymer is collected on a suction funnel, washed with an additional amount of pentane, and dried in a circulating air oven at 50° C. overnight. The dry polymer (94.3% yield) has an inherent viscosity in acetone of 1.12.

EXAMPLE 6

Preparation of poly(benzyl 2-cyanoacrylate)

A mixture of benzyl 2-cyanoacrylate (10.00 g.), n-octane (50.00 g.), and benzoyl peroxide (0.10 g.) is added to a clean, 7-oz., dry nitrogen-flushed, high-pressure bottle. The bottle is sealed with a crown closure after a final ten-second purging with dry nitrogen, and then is tumbled in a water bath first at 70° C. for 30 minutes and finally at 60° C. for 10 hours. The precipitated polymer is collected on a suction funnel, washed with an additional amount of n-octane, and dried in a circulating air oven at 70° C. overnight. The dry polymer (91.2% yield) has an inherent viscosity in toluene of 1.56.

EXAMPLE 7

Polymerization of methyl 2-cyanoacrylate

A mixture of methyl 2-cyanoacrylate (25.00 g.) and n-octane (200.00 g.) is added to a clean, dry nitrogen flushed 500-ml. three-necked flask which is fitted with a dropping funnel, mechanical stirrer, and condenser with drying tube. The mixture is vigorously agitated as twenty-five ml. of 0.04% triethylamine in n-octane catalyst solution is rapidly added under dry nitrogen pressure. The mixture is stirred for an additional fifteen minutes. The precipitated polymer is filtered, washed with octane, and dried in a vacuum oven at 50° C. overnight. The dried polymer (100% yield) has an inherent viscosity in nitromethane of 2.15.

EXAMPLE 8

Polymerization of isobutyl 2-cyanoacrylate

A mixture of isobutyl 2-cyanoacrylate (50.00 g.) and heptane (850.00 ml.) is added to a clean, dry nitrogen flushed 2-1. Three-necked flask which is fitted with a dropping funnel, mechanical stirrer, and condenser with drying tube. The mixture is vigorously agitated as 100 ml. of 0.12% triethyl phosphite in heptane catalyst solution is rapidly added. The mixture is stirred for thirty minutes. The precipitated polymer is filtered, washed with heptane, and dried in a circulating air oven overnight at 50° C. The dried polymer (99.1% yield) has an inherent viscosity in acetone of 1.72.

The following examples in Table I are given to further demonstrate the utility of this polymerization process employing various esters of cyanoacrylic acid. Procedures similar to those in Examples 7 and 8 are followed. The results are shown in Table I.

The invention has been described in detail with particular reference to certain preferred embodiments thereof, but it will be understood that variations and modifications can be effected within the spirit and scope of the invention as described hereinabove.

We claim:

1. Process for preparing a poly(α-cyanoacrylate) ester which is a normally solid polymer which comprises:
   (A) mixing (1) an α-cyanoacrylate monomer having the structural formula

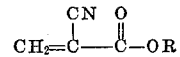

wherein R is an alkyl group having 1–16 carbon atoms; a haloalkyl, alkoxyalkyl, alkenyl, cyanoalkyl, or phenylalkyl group having 1–10 carbon atoms; a cyclohexyl group; or phenyl group and (2) an organic solvent having a solubility parameter from about 6.9 to about 9.0 and a dielectric constant of less than about 10, whereby a solution is formed,
   (B) adding to said solution a catalytically effective amount of up to 2% by weight, based on the weight of the monomer, of a catalyst selected from
   (1) a free radical catalyst, or
   (2) an anionic catalyst
   at a temperature from about 20° C. to about 100° C., whereby said monomer is polymerized and said solid polymer separates from said solution.

2. The process of claim 1 wherein the organic solvent has a solubility parameter within the range of about 7 to about 8 and a dielectric constant of less than about 4.

3. The process of claim 1 wherein the organic solvent is selected from n-hexane, n-heptane, cyclohexane, n-pentane, n-octane, toluene, carbon tetrachloride, and ethyl benzene.

4. The process of claim 1 wherein the free radical catalyst is selected from benzoyl peroxide, azobis(isobutyronitrile) and acetyl peroxide.

5. The process of claim 1 wherein the anionic catalyst is selected from a trialkyl phosphite or trialkylamine.

6. The process of claim 5 wherein the anionic catalyst is selected from triethyl phosphite or triethylamine.

7. The process of claim 1 wherein R is methyl.

8. The process of claim 1 wherein R is ethyl.

9. The process of claim 1 wherein R is isobutyl.

10. The process of claim 1 wherein R is pentyl.

TABLE I

| Example Number | Cyanoacrylate ester | Solvent | Catalyst | Yield | Inherent viscosity |
|---|---|---|---|---|---|
| 9 | 5.0 g. n-decyl ester | 85.0 ml. cyclohexane | 10.0 ml. of 0.24% tri-2-ethylhexyl phosphite | 98.0 | 1.02 |
| 10 | 5.0 g. n-pentyl ester | 50.0 ml. n-hexane | 5.0 ml. of 0.10% trimethylamine | 99.6 | 1.56 |
| 11 | 10.0 g. 3-methoxybutyl ester | 100.0 ml. bicyclohexane | 5.0 ml. of 0.20% tri-n-butyl phosphite | 97.3 | 1.23 |
| 12 | 5.0 g. allyl ester | 25.0 ml. toluene | 5.0 ml. of 0.02% triethylamine | 99.3 | 1.79 |
| 13 | 5.0 g. 2,2,2-trifluoroethyl ester | 50.0 ml. carbon tetrachloride | 10.0 ml. of 0.12% triethyl phosphite | 95.4 | 1.16 |
| 14 | 5.0 g. benzyl ester | 85.0 ml. ethylbenzene | 10.0 ml. of 0.05% tributylamine | 97.7 | 1.42 |

References Cited

UNITED STATES PATENTS 3,483,870 12/1969 Coover et al. ——————— 128—334
3,527,224 9/1970 Rabinowitz ——————— 128—334

JOSEPH L. SCHOFER, Primary Examiner

J. KIGHT, Assistant Examiner

U.S. Cl. X.R.

260—881, 88.7 A